United States Patent [19]
Matsumoto

[11] Patent Number: 5,083,365
[45] Date of Patent: Jan. 28, 1992

[54] PROCESS FOR MANUFACTURING A MAGNETIC HEAD

[75] Inventor: Toshio Matsumoto, Kanagawa, Japan

[73] Assignee: Mitsubishi Denki K. K., Tokyo, Japan

[21] Appl. No.: 206,825

[22] Filed: Jun. 15, 1988

[30] Foreign Application Priority Data

Jun. 22, 1987 [JP] Japan ................... 62-154853

[51] Int. Cl.⁵ ................................. G11B 5/127
[52] U.S. Cl. ........................ 29/603; 360/122
[58] Field of Search ............... 29/603; 156/643; 360/103, 110, 122

[56] References Cited

U.S. PATENT DOCUMENTS

| | | | |
|---|---|---|---|
| 4,298,899 | 11/1981 | Argumedo et al. | 29/603 X |
| 4,333,229 | 6/1982 | Ellenberger | 29/603 |
| 4,549,238 | 10/1985 | Ertingshausen et al. | 360/103 |

Primary Examiner—Timothy V. Eley
Attorney, Agent, or Firm—Kanesaka & Takeuchi

[57] ABSTRACT

A method of making a magnetic head, which includes etching hard matter from the air bearing surface of a slider and polishing the air bearing surface of a magnetic head core together with that of the slider, whereby the floating height of the magnetic head is reduced.

4 Claims, 1 Drawing Sheet

PROCESS FOR MANUFACTURING A MAGNETIC HEAD

BACKGROUND OF THE INVENTION

This invention relates to a method of making a magnetic head which is composed of a slider and a magnetic head core for writing and reading information on a magnetic recording medium.

It is well known that a magnetic head is made by integrating a slider which is made of an Altic material including soft matter, such as Al2O3, and hard matter, such as TiC, and is movable over a magnetic recording medium and a magnetic head core which is made of matter softer than the Altic material and is capable of writing and reading information from the magnetic recording medium and then polishing air bearing surfaces of the slider and the magnetic head core which are opposite to the magnetic recording medium.

Recently, there is a demand for a magnetic head with a small gap between the magnetic head core and the magnetic recording medium so as to increase the recording density on the magnetic recording medium. To meet this demand, the floating height of the magnetic head core from the magnetic recording medium has been reduced by the above method.

The conventional method, however, is not applicable to floating heights of a magnetic head core less than a certain level because of the wear and tear caused by the friction between the magnetic head and the magnetic recording medium. It is difficult to polish the slider containing hard matter but it is not difficult to polish the magnetic head core which is softer than the slider. Consequently, the polishing quantity of the magnetic head core is much larger than that of the slider so that a large recessing takes place in the magnetic head core. As a result, there is a large gap between the magnetic head core and the magnetic recording medium.

SUMMARY OF THE INVENTION

Accordingly, it is an object of the invention to provide an improved method of polishing the slider to decrease the polishing quantity of the magnetic head core for reducing the recessing of the magnetic head.

It is another object of the invention to prevent a large gap from taking place between the magnetic head core and the magnetic recording medium on which information is recorded.

According to the invention there is provided a method of making a magnetic head, which includes the steps of removing by etching hard matter from the air bearing surface of a slider and then polishing the air bearing surface of a magnetic head core.

These and other objects of the invention will become more apparent in the following description when taken in conjunction with the accompanying drawings.

DESCRIPTION OF THE PREFERRED EMBODIMENT

Figure 1:
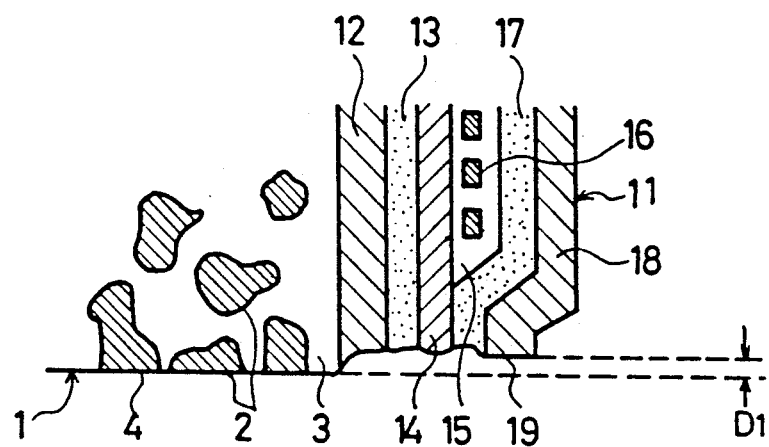
FIG. 1 is a sectional view of a magnetic head before etching according to an embodiment of the invention.
Figure 2:
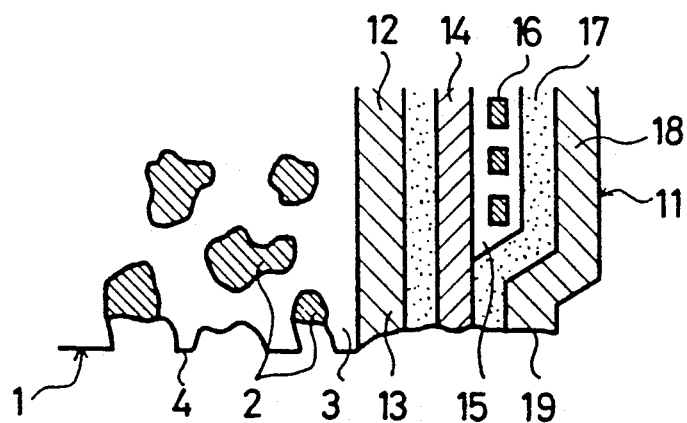
FIG. 2 is a sectional view of a magnetic head after etching according to an embodiment of the invention.
Figure 3:
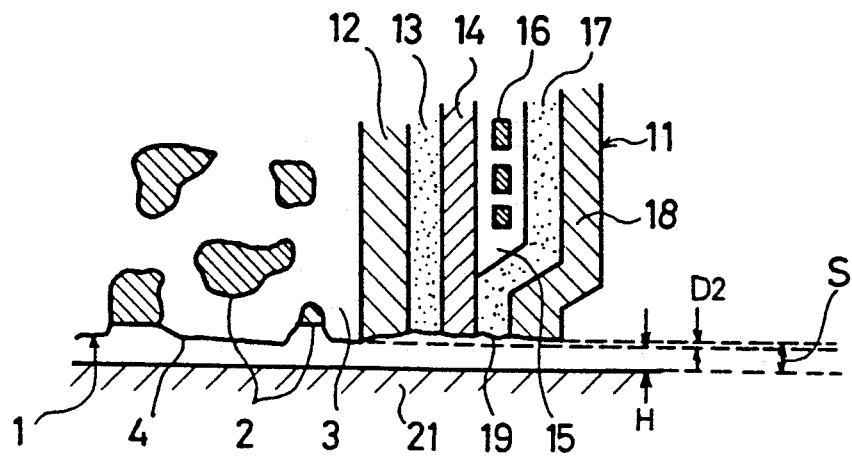
FIG. 3 is a sectional view of a magnetic head after polishing according to an embodiment of the invention.

In FIGS. 1, 2, and 3, a slider 1 which is movable over a magnetic recording medium 21 and a magnetic head core 11 which writes and reads information on the magnetic recording medium are formed by a method of making a magnetic head. The slider 1 is made of an Altic material which consists of hard matter 2, such as TiC, and soft matter 3, such as Al2O3, and has an air bearing surface 4 which faces the magnetic recording medium 21.

As shown in FIG. 1, the magnetic head core 11 consists of an isolation layer 12 made of Al2O3, a magnetic material 13 made of Permalloy and formed on the right side of the isolation layer 12, a gap layer 14 made of Al2O3, SiO2 or the like and formed on the right side of the magnetic material 13, an organic isolation layer 15 formed on the right side of the gap layer 14, a coil 16 formed within the organic layer 15, a magnetic material 17 made of permalloy and formed on the right side of the organic layer 15 to the lower right side of the gap layer 14, and a protective layer 18 made of Al2O3 and formed on the right side of the magnetic material 17.

An air bearing surface 19 is formed on the underside of the magnetic head core 11 so as to face the magnetic recording medium, forming a recessing D1 between the air bearing surface 19 and the air bearing surface 4 of the slider 1. The slider 1 and the magnetic head core 11 are integrated into a single body.

At the next step of the method of the invention as shown in FIG. 2, the air bearing surface 4 of the slider 1 is etched with a gas of CF4 or a mixture gas of CF4 and O2 to selectively remove hard matter 2 from the air bearing surface 4. Then, both of the air bearing surfaces 4 and 19 are polished. The main object of this polishing is to remove the soft matter which projects downwardly from the air bearing surface 4 resulting from the removal of hard matter.

The air bearing surface 19 is polished so that the recessing D2 between the air bearing surface 19 and the air bearing surface 4 is less than the recessing D1. As a result, the gap S between the air bearing surface 19 and the magnetic recording medium 21 is equal to the sum of the recessing D2 and the floating height H.

It is noted that the magnetic head in which hard matter is selectively removed from the slider of Altic matter is also useful for a contact start and stop system as taught in U.S. Pat. No. 4,549,238.

According to the embodiment of the invention as described above, the gap S between the air bearing surface of the magnetic head core 11 and the magnetic recording medium 21 is reduced by the amount of reduction from the recessing D1 to the recessing D2. The magnetic head with the magnetic head core 11 therefore has a capability of writing and reading with a small spacing loss.

While the embodiment of the invention which has the slider 1 made of Altic matter has been described above, it is understood that various modifications may be made to the slider, and it is intended to cover any slider from which only the hard part is removed by an etching process with an etching gas before polishing.

According to the present invention, since the hard matter on the air bearing surface of a slider is removed before polishing, it is easy to polish the air bearing surface of the slider. Since the polishing quantity of a magnetic head core is no more than that of the slider, the recessing of the magnetic head core becomes smaller than that of the conventional one.

With the method as described above, the gap between the air bearing surface of a magnetic head core and the magnetic recording medium is reduced so that the writing and reading with a small spacing loss is possible. Therefore, it is possible to make a magnetic head which is suitable for the high density recording unit.

While a preferred embodiment of the invention has been described using specific terms, such description is for illustrative purposes only, and it is to be understood that changes and variations may be made without departing from the spirit and scope of the appended claims.

What is claimed is:

1. A method of making a magnetic head, which comprises the steps of:

integrating a magnetic head core and a slider made of hard matter and soft matter and movable over a recording medium to form a magnetic head for writing and reading information from said recording medium;

etching part of said hard matter on an air bearing surface of said slider which is opposite to said recording medium; and polishing said air bearing surface of said slider and an air bearing surface of said magnetic head core so as to provide a small amount of recessing between said air bearing surface of said magnetic head core and said air bearing surface of said slider.

2. The method of claim 1, wherein said etching step is carried out with a CF4 gas.

3. The method of claim 1, wherein said etching step is carried out with a mixture of CF4 and O2 gases.

4. The method of claim 1, wherein said hard matter and said soft matter are TiC and Al2O3 respectively.

* * * * *